Jan. 21, 1936.  J. HANSMAN  2,028,662

METHOD OF SIMULATING MOTION AND APPARATUS THEREFOR

Filed March 5, 1934  2 Sheets—Sheet 1

Inventor John Hansman
Attorneys Dyrenforth, Lee, Chritton and Wiles

Jan. 21, 1936. J. HANSMAN 2,028,662
METHOD OF SIMULATING MOTION AND APPARATUS THEREFOR
Filed March 5, 1934    2 Sheets-Sheet 2
Fig. 5
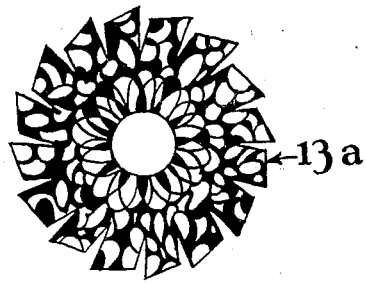
Fig. 6
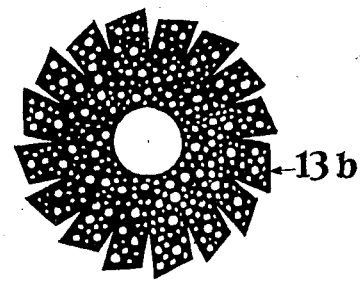
Fig. 7
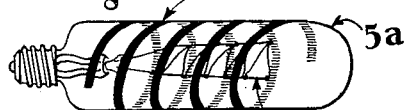
Fig. 8
Fig. 9
Fig. 10
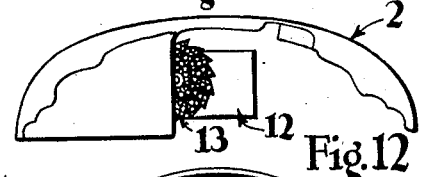
Fig. 11
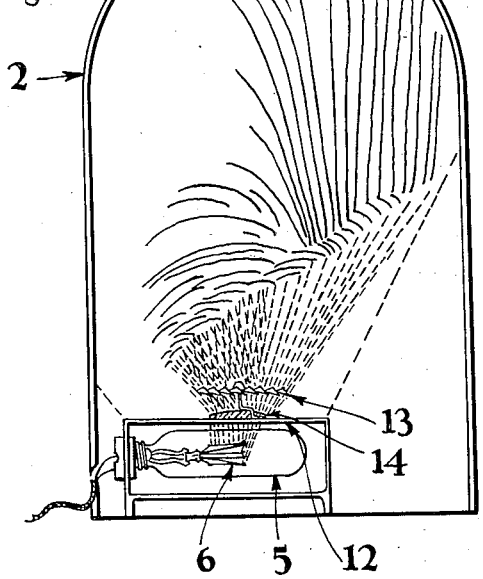
Fig. 12
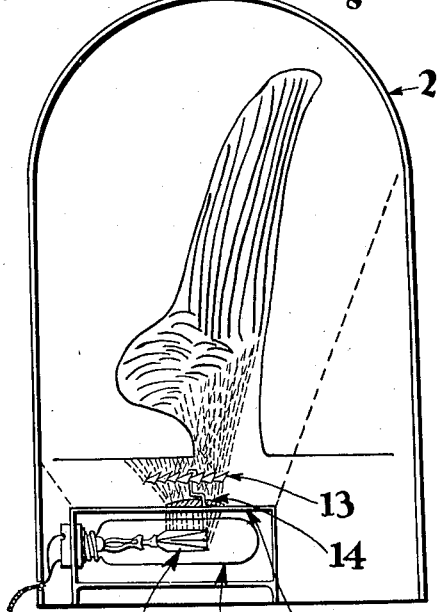
Inventor John Hansman
Attorneys Dyrenforth, Lee, Chritton and Wiles Patented Jan. 21, 1936

2,028,662

UNITED STATES PATENT OFFICE 2,028,662

METHOD OF SIMULATING MOTION AND APPARATUS THEREFOR

John Hansman, Chicago, Ill.

Application March 5, 1934, Serial No. 714,144

11 Claims. (Cl. 40—40)

This invention relates to a method of simulating motion and an apparatus therefor, and more particularly to animated pictures.

It is well known to produce the effect of motion by the use of slotted fans rotating over a source of light. While the effects produced by this method are good, the eye readily becomes accustomed to translating the motion back to its original source and the illusion is by no means complete.

In accordance with the present invention, the motion of the light rays upon the background or picture is so irregular and apparently unrelated to the motion of the shutter or fan that it is impossible for the eye to read back from the motion to the machine which is producing the effect. At the same time it is possible to concentrate the light upon a desired portion of the picture, and means have been provided to absorb the undesired portions of the light.

Figure 1:
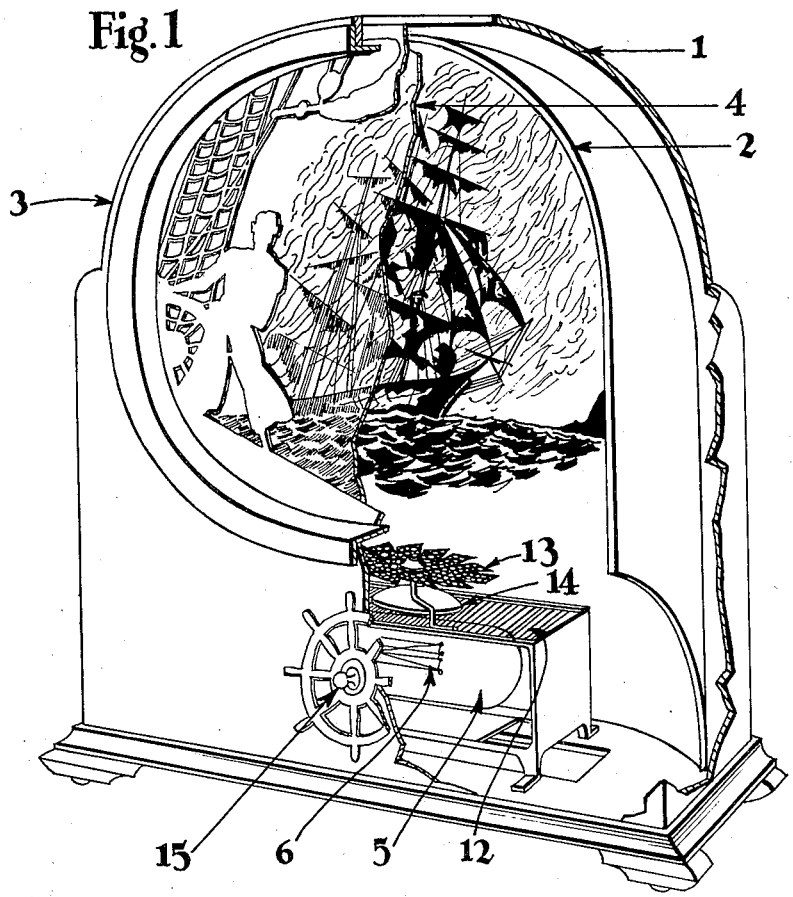
Figure 2:
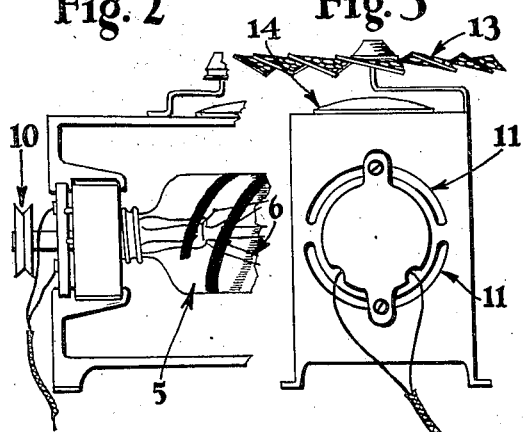
Figure 3:
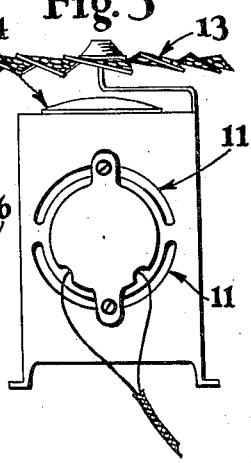
Figure 4:
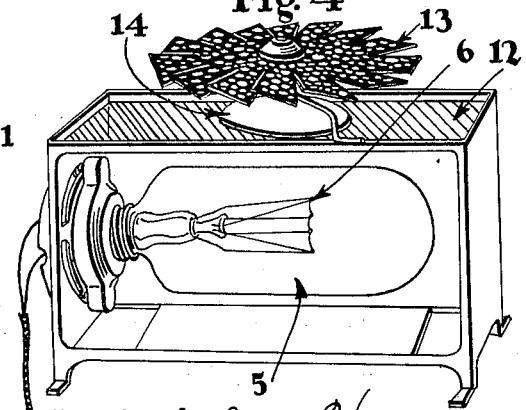

The invention is illustrated in the drawings in which Fig. 1 is a perspective view partly broken away of an animated picture; Fig. 2 is a broken front elevation in section, showing a light bulb and means for rotating same; Fig. 3 is a side elevation showing adjustment slots for a stationary luminous element; Fig. 4 is a perspective view of the lamp housing, lens and shutter; Fig. 5 shows a plan view of one form of fan; Fig. 6 shows a plan view of a second form of fan; Fig. 7 is an enlarged view of a specific form of lamp; Fig. 8 shows a different type of lamp; Fig. 9 illustrates the arrangement of the fan with respect to the background, as shown by a plan view; Fig. 10 is a similar view only partly broken away of a different arrangement; Fig. 11 is a front elevation corresponding to Fig. 9, and showing the lighted areas upon the background; Fig. 12 is a similar front elevation corresponding to Fig. 10.

The apparatus comprises a housing 1, including a background 2, and a foreground 3. As shown in Fig. 1, the background may be formed into various shapes, for example: with its edges somewhat spherical in order to concentrate or catch the light as desired. A picture may be painted upon the background, which in Fig. 1 is shown to be a ship. The foreground 3 may be formed as desired, to frame the picture or otherwise to assist in the effect. As shown in Fig. 1, a nautical scene is provided which blends nicely with the ship in the background.

A color filter may likewise be provided in the foreground. This filter may be used to great advantage in cutting out undesirable portions of the light. For example: by using a yellowish filter and painting certain areas of the background in a complementary color, as with a violet paint, much undesired light is absorbed in the painted areas. The same effect may be created by the use of other complementary colors.

A source of light is provided within the housing, which ordinarily would consist of an electric lamp 5, having a filament 6. In general, best effects are obtained by using an elongated filament. Special types of lamp may be employed as shown, for example, in Figs. 7 and 8. The lamp 5a shown in Fig. 7 is produced with a filament 6a. The lamp is striped with stripe 8. If this lamp is rotated, special effects may be obtained therewith.

In Fig. 8 is shown a lamp 5b, consisting of an opaque core 7, and a neon tube lamp 9 irregularly wrapped around the side. This lamp is likewise designed to be rotated.

Means for rotating the lamp are illustrated in Fig. 2, comprising a pulley 10 operatively connected to the luminous element 5.

In Fig. 3, slots 11 adapted to cooperate with projections upon the base of a luminous element are shown in which a stationary luminous element may readily be mounted.

Light radiated from the luminous element may be passed, if desired, through a colored screen 12, which may be decorated with the appropriate color or scheme to blend with the desired background.

In order to create a true illusion of motion, the light beams falling upon the part of the background to be animated must be made to appear to move, and in accordance with this invention, such motion is imparted by the motion of a fan 13 which is made to revolve by heat radiated by luminous element. The form of this fan, or shutter, may be changed to correspond to the effect to be created. In Fig. 6 is shown a fan 13b provided with numerous small perforations which are used to provide the effect of fire and smoke. By rotating the fan in the opposite direction of that illusion, the effect of water may also be produced upon an appropriate scene. Another form of fan 13a is illustrated in Fig. 5. It is desirable that the perforations be small enough so that they act somewhat in the nature of pin-point lenses.

The effect of such a rotating fan, by itself, is not sufficient, however, to produce a thoroughly satisfactory illusion, inasmuch as an onlooker who once knows the secret of the device readily translates the apparent motion back to the fan.

In order to provide a better illusion, therefore, the lens 14 is provided. The lens is so positioned with respect to the luminous element that a substantial proportion of the light passing through it and on to the background is out of focus. As a result, an extremely good illusion of animation is produced which appears to be due to the fact that in the motion of any particular opening on the fan across the luminous area, successive rays of light come in markedly irregular and different directions, so that it is impossible to correlate these with the motion of the fan, even though the onlooker is fully conversant with the mechanical details of the device. In the device shown, a one inch lens is set about ¾ inch from the light filament. It is generally found that best results are obtained by having the lens out of focus and preferably within its focal length of the light filament. It is also preferred to use an uncorrected lens having a high degree of curvature inasmuch as this increases the distortion of the light rays.

It may be desirable, at times, to so place the lens with respect to the filament that some of the light passing under the background is in focus. If this is done, an area of apparent stationary light will be produced and the motion of the fan has no effect upon it. In this manner, it is possible to produce a brilliant stationary light area, and also animated sections from the same luminous element.

The lens has an additional advantage in that it may be used to concentrate rays upon a particular portion of the background. Arrangements of the lens filament and background to accomplish such results are illustrated in Figs. 11 and 12, in which the shaded areas illustrate the part of the background upon which the light is concentrated. It is, of course, clear that the shape of the background may be made to assist in the formation of these areas.

In the operation of the device, the luminous element is lighted, in this instance by switch 15, and the heat generated therefrom soon causes the fan 13 to revolve. In the scene shown in Fig. 1, the glass strip 12 is painted to throw a red light upon the ship and the motion of the fan causes the light concentrated upon the ship to give the illusion of smoke and flames.

In the specific arrangement shown, there is an area in the center of the ship's sails which would not give the proper illusion and accordingly this area has been painted with a violet paint, which, in conjunction with the filter 4, thoroughly overcomes any contrary illusion.

The foregoing detailed description has been given for clearness and understanding only and no unnecessary limitation should be understood therefrom, but the appended claims should be construed as broadly as permissible in view of the prior art.

What I regard as new, and desire to secure by Letters Patent is:

1. The method of simulating animation in a scene adapted to apparent animation which comprises passing a plurality of beams of light through a refractive medium toward the scene in such manner that adjacent beams are concentrated and are refracted in markedly irregular and different directions, and continuously passing a plurality of small openings across said beams.

2. The method as set forth in claim 1 in which a substantial portion of the light thrown upon said scene is passed through a lens out of focus.

3. The method as set forth in claim 1 in which a substantial portion of the light falling upon said scene is passed through a concentrating lens situated within its focal length of the source of such light.

4. The method as set forth in claim 1 in which a substantial portion of the light falling upon said scene is passed through a concentrating lens situated within its focal length of the source of such light and in which the lens has a high degree of curvature and is uncorrected.

5. Apparatus for producing an animated picture, comprising a luminous element, means for distorting and concentrating the light from said element, means for continuously moving a plurality of small openings across the light, and a scene adapted to apparent animation upon which the light passing through said openings is concentrated.

6. Apparatus as set forth in claim 5 in which the means for distorting light is a concentrating lens.

7. Apparatus as set forth in claim 5 in which the means for distorting the light is a concentrating lens out of focus with respect to the source of light.

8. Apparatus of the class set forth comprising a source of light and a concentrating lens out of focus with respect to said light, means for continuously passing a plurality of small openings across the light through the lens, and a picture adapted to apparent animation upon which the light passing through said openings is thrown.

9. Apparatus as set forth in claim 8 in which said lens is within its focal length of said source of light.

10. Apparatus as set forth in claim 8 in which said source of light comprises an extended luminous filament.

11. Apparatus as set forth in claim 8 in which the lens is an uncorrected lens having a short radius of curvature.

JOHN HANSMAN. [L. S.]